United States Patent [19]
Dins et al.

[11] Patent Number: 5,895,338
[45] Date of Patent: Apr. 20, 1999

[54] ENGINE BRAKING SYSTEM USING ALTERNATOR STATOR WINDINGS

[75] Inventors: Michael J. Dins; Michael R. Kleczewski, both of Cleveland; Robert K. Lindorfer, Jr.; Hal R. Johnson, both of Sheboygan, all of Wis.

[73] Assignee: Kohler Co., Kohler, Wis.

[21] Appl. No.: 08/967,772

[22] Filed: Nov. 12, 1997

[51] Int. Cl.⁶ .................. B60K 41/20; H02K 49/10; A01D 69/10
[52] U.S. Cl. .................. 477/200; 56/11.3; 310/103; 188/161
[58] Field of Search .................. 477/199, 200; 188/158, 159, 161, 162, 267; 192/216, 226; 310/103, 105, 106, 93, 77; 56/10.2 R, 10.5, 11.3; 123/DIG. 11, 198 D, 198 DC

[56] References Cited

U.S. PATENT DOCUMENTS

| | | | |
|---|---|---|---|
| 3,111,800 | 11/1963 | Quianthy | 56/25.4 |
| 3,290,871 | 12/1966 | Haas | 477/200 X |
| 3,659,170 | 4/1972 | Burkett et al. | 310/77 X |
| 3,773,156 | 11/1973 | Nyquist | 192/0.094 |
| 4,181,206 | 1/1980 | Seilenbinder | 192/0.084 |
| 4,236,494 | 12/1980 | Fairchild | 123/630 |
| 4,419,857 | 12/1983 | Smith | 56/11.3 |
| 4,430,604 | 2/1984 | Loganbill et al. | 56/10.5 X |
| 4,570,766 | 2/1986 | Golobay | 192/18 R |
| 4,585,115 | 4/1986 | Lindblom et al. | 198/624 |
| 4,885,903 | 12/1989 | Scag | 56/10.8 |
| 5,119,918 | 6/1992 | Pardee | 192/18 B |
| 5,490,584 | 2/1996 | Estaque et al. | 310/105 X |

*Primary Examiner*—Charles A. Marmor
*Assistant Examiner*—Ankur Parekh
*Attorney, Agent, or Firm*—Quarles & Brady, LLP

[57] ABSTRACT

The alternator on an engine has a set of stator coils which are connected to supply current to power accessories and current for a battery charger when the engine is running. When the ignition is turned off, a braking switch is closed which short circuits the stator coils. The resulting high current in the stator coils produces a braking torque on the engine shaft that brings it and any attached implement to a rapid halt.

7 Claims, 3 Drawing Sheets

ENGINE BRAKING SYSTEM USING ALTERNATOR STATOR WINDINGS

BACKGROUND OF THE INVENTION

The field of the invention is engine driven implements, and more particularly, the braking of such implements as mower blades when the engine is shut down.

Farm, lawn and garden implements, such as mowers, power sweepers, aerators or the like are normally driven directly from the power take-off of a gasoline engine or indirectly through a clutch. It has become increasingly common on larger equipment to use an electrically controlled clutch which also includes a brake mechanism. When the clutch is operated to disengage the operating tool, such as a mower blade, from the engine, the brake mechanism engages to decelerate the operating tool and bring it to a stop quickly. Such clutch and brake mechanisms are shown, for example, in U.S. Pat. Nos. 3,773,156; 4,181,206; 4,585,115; and 4,570,766.

On smaller implements such as lawn mowers the use of separate clutch and brake mechanisms have also been proposed as disclosed in U.S. Pat. No. 3,111,800, but in general such structures are considered too costly. In most cases, therefore, the engine simply coasts to a stop when the ignition circuit is interrupted as described, for example, in U.S. Pat. Nos. 4,236,494 and 4,885,903.

SUMMARY OF THE INVENTION

The present invention is a reliable and inexpensive brake for bringing an engine shaft and any attached implements to a rapid halt when the engine is shut down. More specifically, it includes a set of permanent magnets which are mounted for rotation by the shaft; a stator winding mounted to the engine to interact with the rotating magnets and produce a current therein; and a braking switch connected to the stator winding and being operable when the engine is shut down to short circuit the stator winding. The large current that results when the stator winding is short circuited interacts with the magnetic field of the rotating magnets to produce a braking torque on the engine shaft which brings it and any attached implement to a rapid halt.

A general object of the invention is to provide a reliable brake for an implement driven by an engine. There are very few mechanical parts which can wear out. Switches are highly reliable devices which are easy to replace if they malfunction. The permanent magnets and stator winding form an alternator which is also a very reliable device.

Another object of the invention is to provide an economical brake. The alternator is a necessary component of the engine to provide current for various purposes while the engine is running. The present invention makes use of this same structure with the addition of a braking switch to produce a braking torque when the engine is shut down. No complex mechanical or electrical structures are required.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

DESCRIPTION OF THE PREFERRED EMBODIMENT

Figure 1:
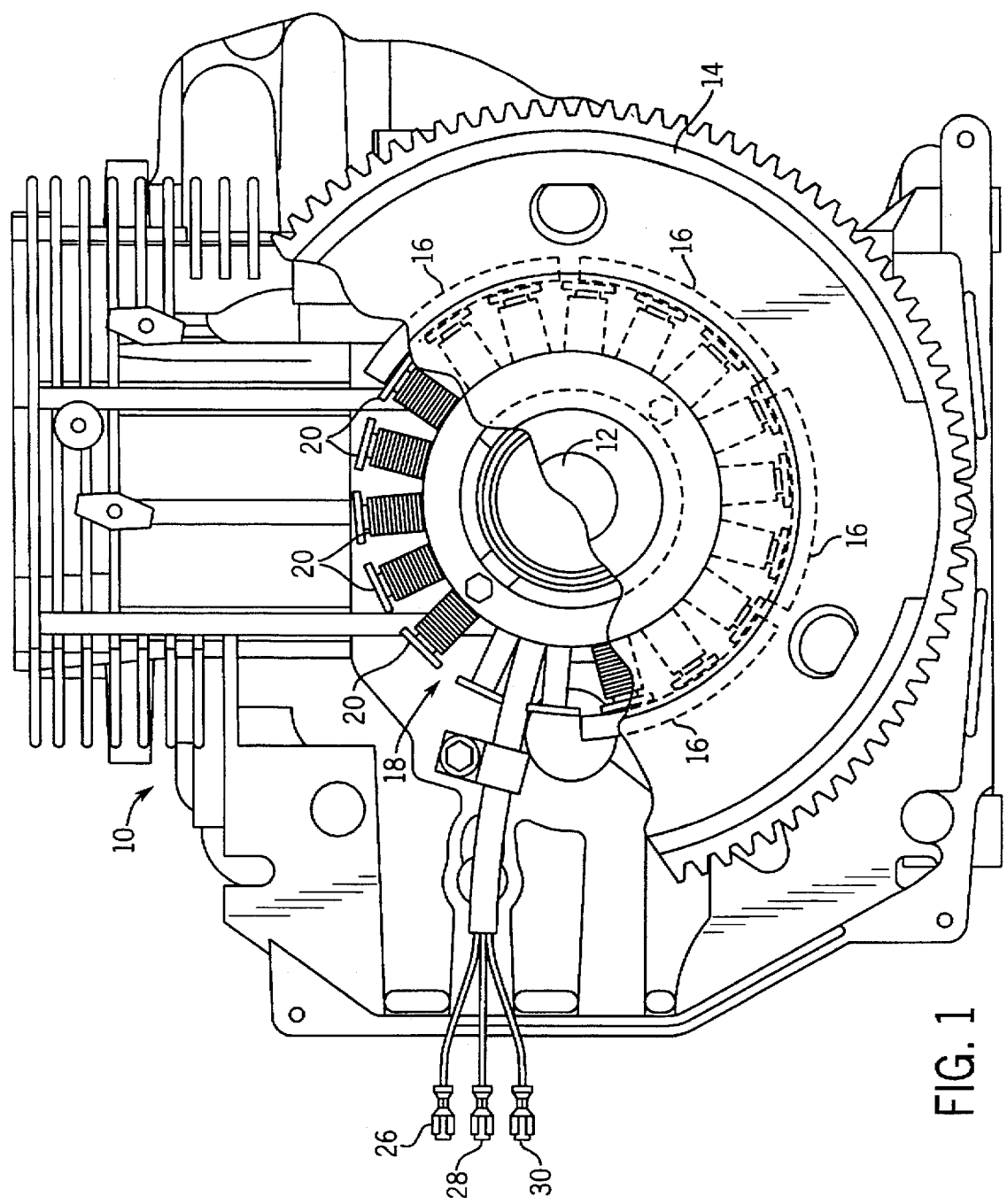
FIG. 1 is an elevation view with parts cut away of an engine which employs the present invention.

Referring particularly to FIG. 1, an internal combustion engine 10 rotates a shaft 12 which may be coupled to operate an implement such as a mower blade or the like (not shown in the drawings). A flywheel 14 mounts to the shaft 12 and it supports a ring of permanent magnets 16 that encircle the shaft 12 and face radially inward. A stator assembly 18 is mounted to the engine 10 and is positioned in the same plane as the magnets 16. The stator assembly includes eighteen separate coils 20 that are disposed in a circle around the shaft 12 and spaced equidistantly apart. The coils 20 are connected in series and form a single stator winding.

When the engine 10 is operating, the shaft 12 rotates the magnets 16 around the stationary stator assembly 18. An AC current is induced in the stator winding by its interaction with the changing magnetic field produced by the rotating magnets. As is well known in the art, this same interaction which generates the current in the stator winding also produces a torque on the shaft 12 which opposes its rotary motion. The greater the generated current, the greater this opposing torque.

Figure 2:
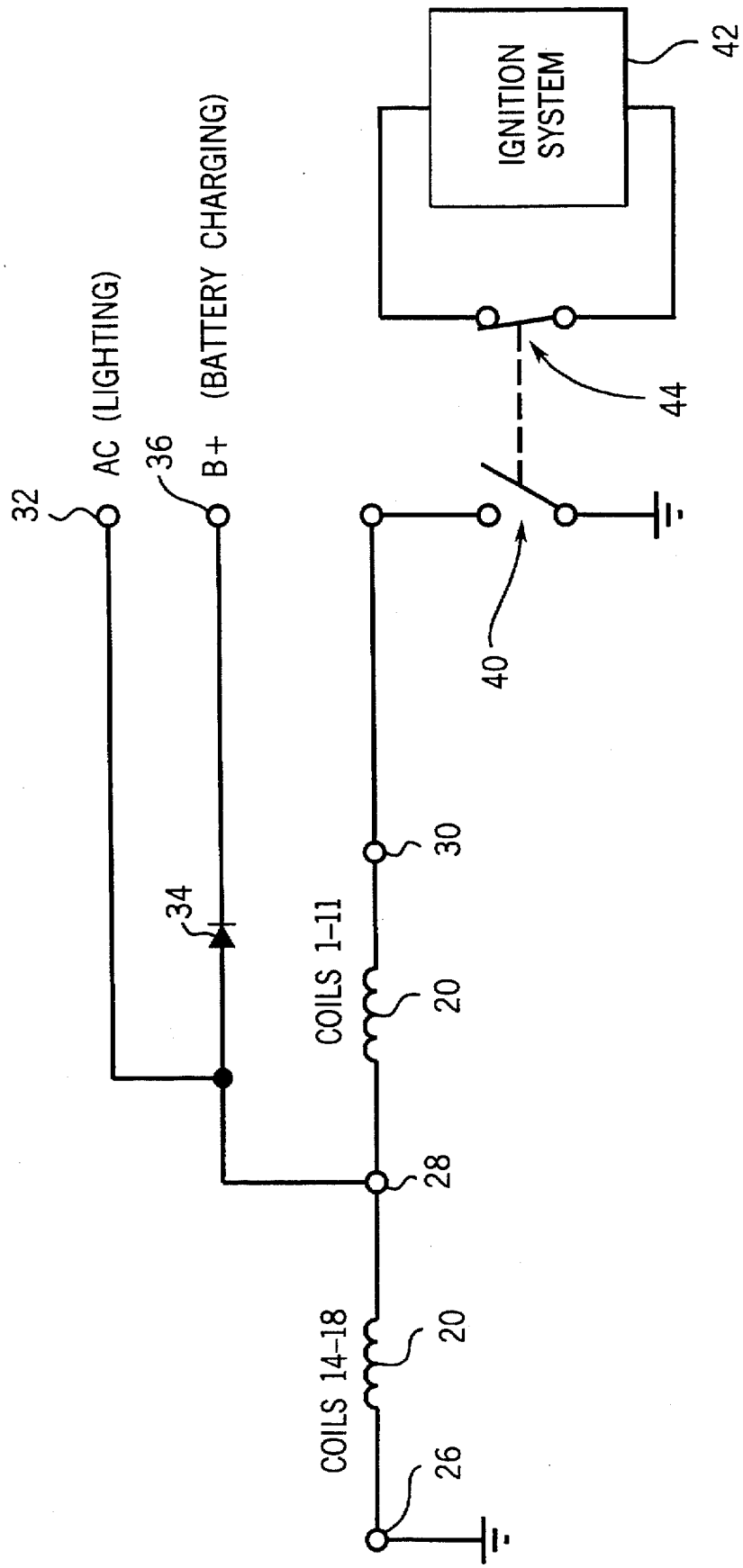
FIG. 2 is an electrical schematic diagram of a circuit used with the engine of FIG. 1 to implement the preferred embodiment of the invention.

Referring particularly to FIG. 2, three leads 26, 28 and 30 are connected to the stator winding. The first eleven serially connected stator coils 20 are connected between leads 28 and 30, and the last five serially connected stator coils 20 are connected between leads 26 and 28.

Lead 26 is connected to circuit ground and lead 28 provides AC current for the implement at a terminal 32. The lead 28 also connects through a diode 34 to provide DC current for a battery charger at terminal 36. During normal engine operation, therefore, an AC current is produced by the five stator coils 20 (labeled 14–18 in FIG. 2) which power such things as lighting and provides a charging current to the implement battery.

The third lead 30 from the stator winding connects to circuit ground through a braking switch 40. When the braking switch 40 is closed, both ends of the stator winding are thus connected to circuit ground and the winding is short circuited. As a result, a huge current flows through the stator winding and a corresponding large braking torque is applied to the engine shaft 12.

During normal engine operation the braking switch 40 is open as shown in FIG. 2 and no current is produced by the eleven stator coils 20 connected between leads 28 and 30 (labeled coils 1–11 in FIG. 2). The braking switch 40 may form part of the engine ignition system indicated generally at 42, and may, for example, be mechanically operated along with an ignition switch 44. When the ignition switch 44 is closed to operate the engine 10, the braking switch 40 is opened so that no braking torque is produced. When the ignition switch 44 is opened, however, the braking switch 40 is closed and a braking torque is produced by the flow of stator winding current. This brings the engine shaft 12 rapidly to a halt. As a result, any implement such as a mower blade which is driven by the shaft 12 is also brought to a stop quickly.

Figure 3:
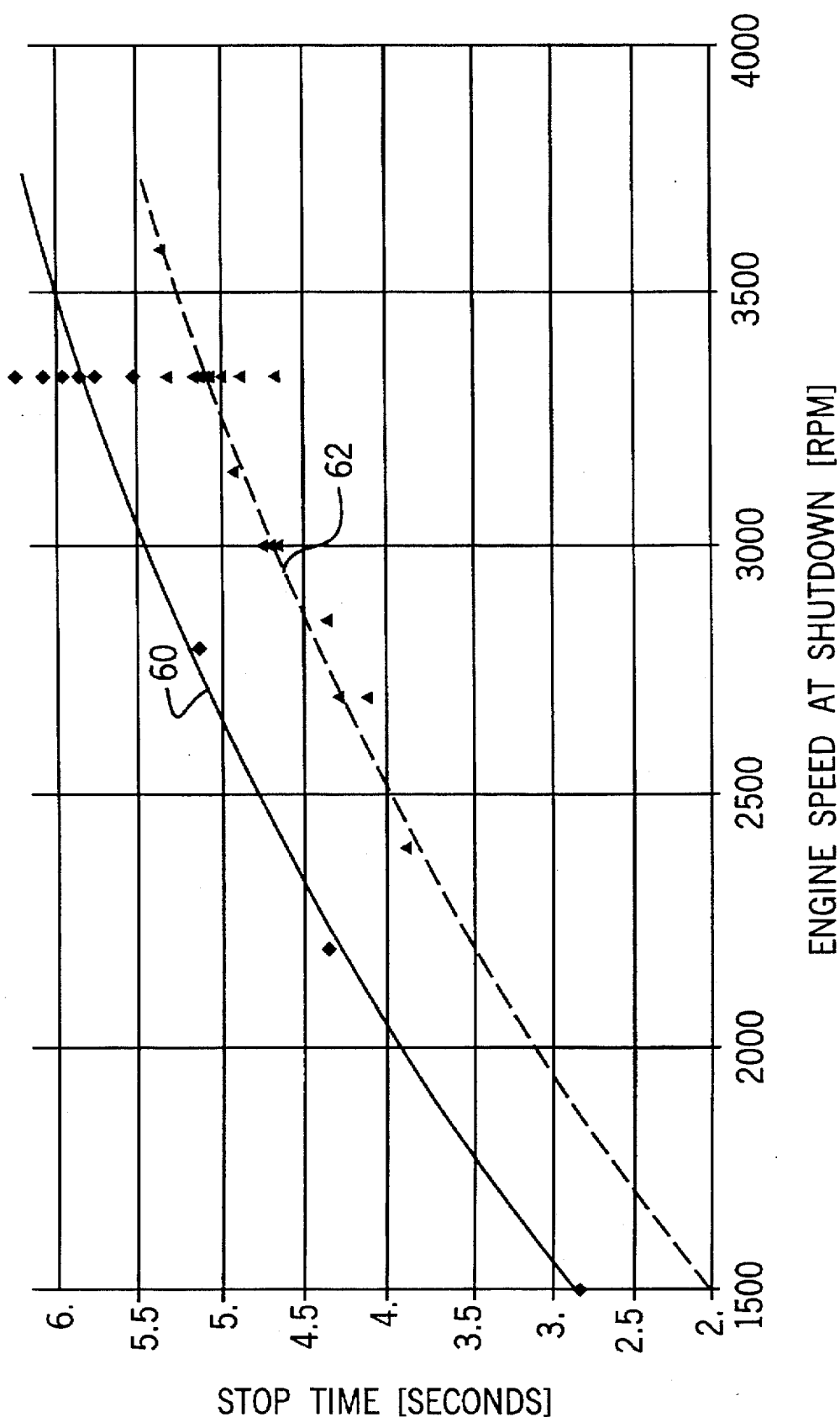
FIG. 3 is a graphic illustration of the braking provided by the present invention.

Referring particularly to FIG. 3, when applied to a garden tractor, the present invention reduced the braking time for its rotating blade by approximately 15%. The curve 60 indicates the braking time as a function of engine speed for the garden tractor without the present invention. The curve 62 indicates the braking time for the same garden tractor when the preferred embodiment of the invention is employed. The present invention maintains the braking time below 5 seconds up to an engine speed of 3300 rpm, where as this same 5 second limit is exceeded at an engine speed of 2700 rpm when the invention is not used.

We claim:

1. In an engine which rotates a shaft coupled to an implement, the improvement comprising:
   - a set of permanent magnets mounted for rotation by the shaft;
   - a stator winding mounted to the engine and positioned adjacent the set of permanent magnets such that a current is induced in the stator winding when the shaft rotates; and
   - a braking switch connected to the stator winding and being operable when the engine is shut down to short circuit the stator winding and produce a large current therein which interacts with a magnetic field produced by the permanent magnets to produce a torque on the shaft which brings the shaft and attached implement to a stop.

2. The improvement as recited in claim 1 in which the stator winding supplies current for accessories associated with the engine when the engine is operating.

3. The improvement as recited in claim 1 in which the stator winding is comprised of a set of stator coils disposed around the engine shaft.

4. The improvement as recited in claim 3 in which one or more of the stator coils supplies current for accessories associated with the engine when the engine is operating.

5. The improvement as recited in claim 3 in which the set coils are connected in series.

6. The improvement as recited in claim 1 in which one end of the stator winding is connected to circuit ground and the other end of the stator winding is connected to circuit ground through the braking switch.

7. The improvement as recited in claim 1 in which the braking switch is operated by an ignition system on the engine.

* * * * *